Patented Feb. 5, 1952

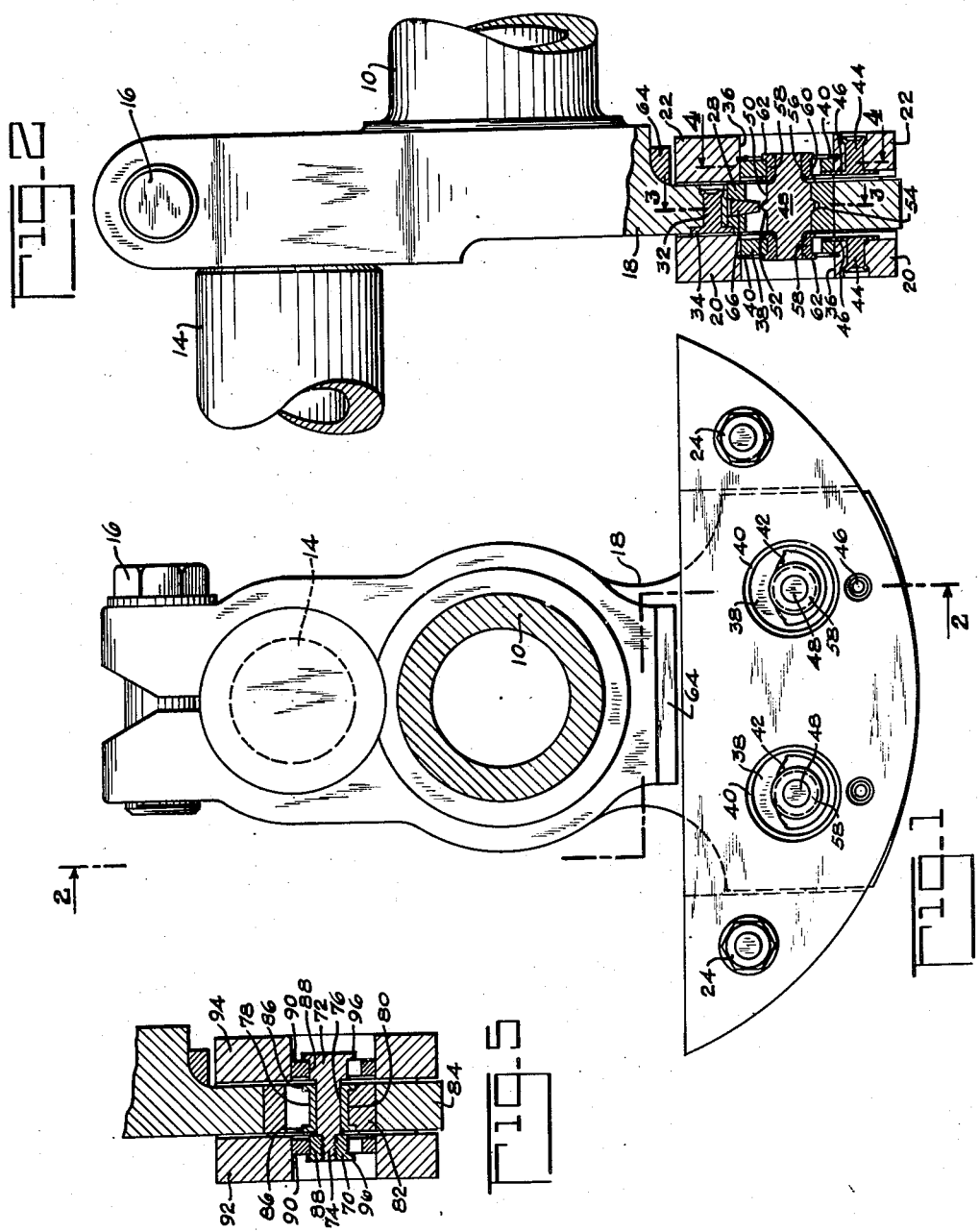

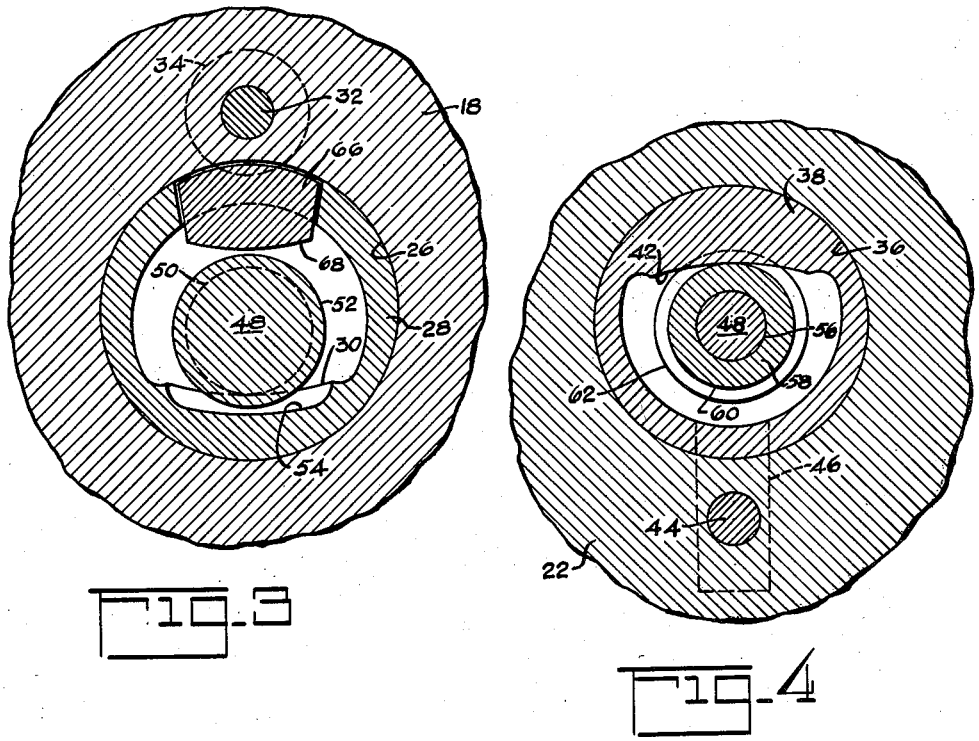

2,584,384

UNITED STATES PATENT OFFICE 2,584,384

VIBRATION DAMPER

Marshall W. Galliers, Radburn, N. J., assignor to Curtiss-Wright Corporation, a corporation of Delaware Application December 30, 1949, Serial No. 135,946

10 Claims. (Cl. 74—604)

This invention relates to torsional vibration dampers and is particularly directed to torsional vibration dampers of the centrifugal pendulum type—for example to the type of damper illustrated in Patent No. 2,112,984 to R. Chilton.

Torsional vibration dampers of the type disclosed in said patent have gone into widespread use on aircraft internal combustion engines for damping torsional vibrations of the engine crankshaft. Such dampers comprise a weight or counterweight member pivotally supported on a lateral extension of the engine crankshaft by a pair of spaced rollers each extending into holes in said weight member and in said crankshaft extension, said holes forming tracks for said rollers with the radius of said tracks being larger than the radius of said rollers. The construction is such that the rolling action of the rollers on their tracks provides a pendular bi-filar support for the weight member from the crankshaft extension whereby said weight member and rollers comprise a centrifugal pendulum supported from the crankshaft. Such a centrifugal pendulum has a constant frequency of vibration per revolution of its supporting crankshaft at all speeds of said crankshaft, the magnitude of said frequency depending on the pendulum length. Frequency of vibration per revolution is commonly termed order of vibration so that a centrifugal type torsional vibration damper has a constant order of vibration. The frequency of the vibration exciting forces of an internal combustion engine crankshaft are also of constant order whereby said centrifugal pendulum is effective to dampen said torsional vibrations if its order of vibration is equal or tuned to the order of vibration of the vibration exciting forces.

It has been found that engine crankshafts are also subject to bending vibrations which cause vibrations of the damper weight member in a direction parallel to the axis of the crankshaft. Such axial or bending vibrations cause axial sliding of the damper rollers relative to their tracks thereby causing considerable wear along the normally engaged central portions of said track and materially altering the radius of said central track portions. The pendulum length of a centrifugal type torsional vibration damper is equal to the difference between the diameter of the damper rollers and the diameter of their tracks. In the case of a damper for an internal combustion engine crankshaft, this pendulum length is small so that any material change in the radius of the portion of the tracks engaged by the damper rollers causes an appreciable percentage change in the damper pendulum length thereby causing an appreciable change in its order of vibration. Obviously any change in the order of vibration of the damper de-tunes the damper thereby rendering it relatively inefficient to dampen the torsional vibrations for which the damper was designed.

An object of the present invention comprises the provision of a novel centrifugal type torsional vibration damper in which relative axial sliding motion between the rolling contact engaging surfaces of the damper rollers and their tracks is prevented or at least minimized. With such a construction the rate of wear of the rolling engaging surfaces of the rollers and/or their tracks is greatly reduced thereby minimizing any change in the order of the damper as a result of wear of the damper parts. Accordingly, with the present invention the order of the damper remains substantially constant in synchronism with the order of the torsional vibrations of the crankshaft which the damper was designed to dampen.

Other objects of the invention will become apparent upon reading the annexed detailed description in connection with the drawing in which:

Figure 1 is an end view of a torsional vibration damper embodying the present invention;

Figure 2 is a view partly in section taken along line 2—2 of Figure 1;

Figures 3 and 4 are enlarged sectional views taken along lines 3—3 and 4—4, respectively, of Figure 2; and Figure 5 is a sectional view similar to the sectional portion of Figure 2 but illustrating a modified construction.

Referring now to Figures 1 to 4 of the drawing, an engine crankshaft 10 has a crankcheek 12 clamped to a crankpin 14 by a bolt 16 in accordance with conventional crankshaft construction. The crankcheek 12 is provided with a portion 18 extending laterally from the axis of the crankshaft on the side of said shaft opposite to its crankpin 14. A weight or counterweight member, comprising plates 20 and 22 clamped together by bolts 24, is disposed about and in clearance relation to the crankshaft extension 18. The crankshaft extension 18 is provided with a pair of spaced parallel bores 26 within which hardened rings 28 are secured, as by a press fit. Each of the rings 28 has a cylindrical track 30 identical with the track on the other ring and facing away from the crankshaft axis, the axis of each track being disposed parallel to the crankshaft axis.

In addition, each ring 28 is rotatively fixed by means of a rivet 32 secured to the crankshaft extension 18 and having a head 34 received within a notch in the periphery of and at the end of its associated ring 28.

Each of the counterweight plates 20 and 22 is provided with a pair of spaced parallel bores 36 alined with the corresponding bores 36 in the other of said plates. A hardened ring 38 is fitted within each of the bores 36. Each ring 38 is maintained in position within its bore 36 between a split snap ring 40 disposed in a groove in its counterweight plate and a head 46 of a rivet 44 secured to said counterweight plate. In addition the head 46 of each rivet 44 is rectangular and extends into a groove in an end face of its associated ring 38 to prevent rotation of said ring within its bore 36. A cylindrical track 42, having the same radius as the tracks 30, is provided on each ring 38, each said track 38 facing radially outwardly relative to the crankshaft axis and disposed radially inwardly of the adjacent crankshaft extension track 30. Accordingly, although each track 42 is axially spaced from the adjacent cylindrical track 30, said tracks may be described as facing each other.

A pair of roller members 48 are provided, each roller member extending into a pair of alined rings 38 through one of the rings 28 in the crankshaft extension 18. Each roller member 48 has a cylindrical surface 50 midway of its ends, said roller member surface being disposed for rolling engagement with its adjacent track 30 and having a smaller radius than the radius of its track 30. In addition each roller member 48 has an annular flange 52 midway between the ends of its surface 50 and adapted to fit within a groove 54 within its track member 30 to prevent relative axial movement between said track 30 and the roller member 48.

Each roller member 48 also has a pair of reduced diameter end portions 56. A bushing 58 is slidably fitted over each roller end portion. Each bushing 58 has an external cylindrical surface 60 adapted to rollably engage the adjacent track 42, the radius of said bushing cylindrical surface 60 being the same as the radius of the roller member surface 50. In addition each bushing 58 has a pair of end flanges 62 engaging the ends of its associated ring 38 to prevent axial movement between the bushing cylindrical surface 60 and its track 42. Each bushing 58, however, can slide axially relative to its roller member 48 along its roller member end portion 56.

The roller members 48 and the bushings 58 rollably engage the tracks 30 and 42 to provide a pendular bi-filar support for the counterweights 20, 22 from the crankshaft extension 18 thereby providing a centrifugal-pendulum-type torsional vibration damper which is capable of damping torsional vibrations of the shaft 10 of the same order of vibration as the order of vibration of said pendulum damper. In general, the crankshaft 10 is also subject to bending vibrations thereby causing vibration of the crankshaft extension 18 in a direction parallel to the axis of the crankshaft. In prior art centrifugal-pendulum-type torsional vibration dampers, such axial vibration causes axial sliding of the damper rollers along their tracks thereby causing wear of said tracks. This wear is largely along the central portions of said tracks since the rollers normally engage said central portions. It has been found that such wear along the central portions of said tracks causes a substantial change in the effective radius of said central track portions thereby materially altering the order of vibration of the damper. Obviously, any substantial change in the order of vibration of the damper renders it ineffective to dampen the order of torsional vibrations of the crankshaft for which the damper was designed. With the construction of the present invention, however, the cylindrical surface 50 of the roller member 48 rollably engages the track 30 but cannot slide axially relative to said track because of the flange 52 and the mating groove 54. Similarly the surface 60 of each bushing 58 rollably engages its respective cylindrical track 42 but the bushing flanges 62 prevent any axial sliding movement between each said surface and its track. Accordingly axial vibration of the crankshaft extension 18 causes only relative axial sliding between each roller member end portion 56 and its bushing 58. Because the internal diameter of each bushing 58 is substantially the same as the external diameter of the roller member end portion 56 fitted therein, the contact pressure per unit area exerted by each roller member against its bushing 58 is substantially less than the contact pressure per unit area exerted by the surfaces of the roller member 48 and its bushings 58 against their respective tracks 30 and 42. Accordingly the wear between the roller member 48 and its bushing 58 is much less than the wear which takes place along the tracks of conventional centrifugal-pendulum-type torsional vibration dampers as a result of axial vibration of the crankshaft extension on which the damper is supported. Furthermore, although wear between the roller member end portions 56 and their bushings 58 moves the center of gravity of the counterweight member 20, 22 radially outwardly, this change in the center of gravity of the counterweight member 20, 22 has only a relatively small effect on the order of vibration of the damper as compared to a change in the radius of the tracks produced by a corresponding amount of wear.

When the engine is rotating at low speeds, as when the engine is being cranked or when the engine operation is erratic, as when the engine backfires, the centrifugal force acting on the counterweight 20, 22 may be insufficient to hold the counterweight outwardly to maintain their roller members against their tracks. Accordingly it is conventional practice to provide a stop 64 to limit radially inward movement of the counterweight. In addition, if desired, each ring 28 may be provided with an abutment member 66 having a surface 68 disposed parallel to the associated track 30, said surface 66 having the same radius as said track. Each abutment surface 68 is disposed in small clearance relation to its adjacent roller member flange 52 to limit its roller member to a smaller range of movement off its track 30 toward the axis of the crankshaft than the range of movement of the counterweight 20, 22 toward said axis.

Obviously, instead of fixing each roller member axially relative to the crankshaft extension each roller member may be fixed axially relative to the counterweight member. Such a modification is schematically illustrated in Figure 5. In Figure 5, a roller member comprises parts 70 and 72 connected together by threads 74. The roller member part 72 has a reduced diameter intermediate portion 76 on which a cylindrical bushing 78 is fitted for axially sliding movement.

This two-part roller construction permits assembly of the bushing 78 on the roller member.

The bushing 78 is arranged for rolling engagement with a track 80 provided by a hardened ring 82 secured within a bore in the crankshaft extension 84. External end flanges 86 on the bushing 78 engage grooves in the ends of the ring 82 to prevent relative axial sliding movement between said bushing and its track 80. The roller member 70, 72 also has end cylindrical surfaces engageable with tracks 88 provided by hardened rings 90 secured within alined bores in the counterweight plates 92 and 94, said plates being rigidly secured together. End flanges 96 on the roller member 70, 72 engage the counterweight member rings 90 to prevent relative axial sliding movement between said roller member and its tracks 88.

The damper of Figure 5 is generally similar to that of Figures 1 to 4 so that, although only one roller member 70, 72 has been illustrated in Figure 5, there are two such roller members providing a pendular bi-filar support for the counterweight 92, 94 from the crankshaft extension 84. Accordingly, in Figure 5 axial vibration of the crankshaft extension 84 does not produce any axial sliding of the roller members 70, 72 and bushings 78 along their tracks 88 and 80 respectively. Instead, such axial vibrations merely cause axial sliding of the bushings 78 along their respective reduced diameter portions 76 of the roller members. Therefore, in the damper of Figure 5 as in the damper of Figures 1 to 4, axial vibrations of the crankshaft extension cause wear only between the roller members and their axially slidable bushings whereby said wear is small and does not appreciably alter the order of vibration of the damper.

In the damper of Figure 5, instead of the end flanges 86 on each bushing 78 said bushing could be provided with a flange intermediate its ends mating with a groove in its track 80 similar to the flange 52 and groove 54 of Figures 1 to 4. Likewise the flange 52 and groove 54 of Figures 1 to 4 could be replaced by a pair of flanges engaging grooves in the ends of the ring 28 similar to the flanges 86 of Figure 5.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Means for damping vibrations of a shaft member; said damping means comprising a weight member; each of said members having an arcuate track facing the arcuate track on the other of said members; roller means disposed between said tracks for providing a pendular support for said weight member from said shaft member, said roller means comprising a roller member having a first portion disposed for rolling engagement with one of said tracks and having a second portion, said roller means also comprising a bushing slidably fitted about said roller member second portion for axial sliding movement relative to said roller member and for rolling engagement with the other of said tracks; means for preventing relative axial movement between said roller member and its said one track; and means for preventing relative axial movement between said bushing and its said other track.

2. Vibration damping means as recited in claim 1 in which the radius of the roller member surface disposed for rolling engagement with its said one track is equal to the radius of the surface of said bushing disposed for rolling engagement with its said other track.

3. Means for damping vibrations of a shaft member; said damping means comprising a weight member; each of said members having an arcuate track facing the arcuate track on the other of said members; roller means disposed between said tracks for providing a pendular support for said weight member from said shaft member, said roller means comprising a roller member having a first portion disposed for rolling engagement with one of said tracks and having a second portion, said roller means also comprising a bushing slidably fitted about said roller member second portion for axial sliding movement relative to said roller member and for rolling engagement with the other of said tracks; radially overlapping portions on said roller member and its said one track for preventing relative axial movement therebetween; and radially overlapping portions on said bushing and its said other track for preventing relative axial movement therebetween.

4. Means for damping vibrations of a shaft member; said damping means comprising a weight member; each of said members having an arcuate track facing the arcuate track on the other of said members; roller means disposed between said tracks for providing a pendular support for said weight member from said shaft member, said roller means comprising a roller member having a first portion disposed for rolling engagement with said shaft member track and having a reduced diameter second portion, said roller means also comprising a bushing slidably fitted about said roller member reduced diameter portion for rolling engagement with said weight member track; an external annular flange on said roller member first portion engageable in a groove in said track for preventing relative axial movement therebetween; and radially overlapping portions on said bushing and said weight member track for preventing relative axial movement therebetween.

5. Vibration damping means as recited in claim 4 and including a stop member on said shaft member and having an arcuate surface facing and parallel to said shaft member arcuate track; said stop member arcuate surface being engageable by said annular roller member flange to limit the range of movement of said roller member off the shaft member arcuate track.

6. Means for damping vibrations of a shaft member; said means comprising a weight member; each of said members having two parallel laterally spaced arcuate tracks facing corresponding arcuate tracks on the other of said members; a pair of roller means, one for each facing pair of said arcuate tracks and disposed therebetween for providing a pendular support for said weight member from said shaft member, each said roller means comprising a first portion disposed for rolling engagement with one of its associated tracks and having a reduced diameter portion, each said roller means also comprising a bushing slidably fitted over the reduced diameter portion of its roller means for axial movement relative to said reduced diameter portion and for rolling engagement with the other track associated with said roller means, the radius of the surface of each roller means first portion disposed for rolling engagement with its track being equal to the radius of the surface of each roller means bushing disposed for rolling engagement with its associated track.

7. Means for damping vibrations of a shaft member; said means comprising a weight member; each of said members having two parallel laterally spaced arcuate tracks facing corresponding arcuate tracks on the other of said members; a pair of roller means, one for each facing pair of said arcuate tracks and disposed therebetween for providing a pendular support for said weight member from said shaft member, each said roller means comprising a first portion disposed for rolling engagement with one of its associated tracks and having a reduced diameter portion, each said roller means also comprising a bushing slidably fitted over the reduced diameter portion of its roller means for axial movement relative to said reduced diameter portion and for rolling engagement with the other track associated with said roller means, the radius of the surface of each roller means first portion disposed for rolling engagement with its track being equal to the radius of the surface of each roller means bushing disposed for rolling engagement with its associated track; radially overlapping portions on each roller means first portion and on its associated track for preventing relative axial movement therebetween; and radially overlapping portions on each said bushing and its associated track for preventing relative axial movement therebetween.

8. Means for damping vibrations of a shaft member; said damping means comprising a weight member; each of said members having an arcuate track facing the arcuate track on the other of said members; roller means disposed between said tracks for rolling engagement with said tracks to provide a pendular support for said weight member from said shaft member; and an abutment on said shaft member having an arcuate surface facing and parallel to said shaft member arcuate track and engageable by said roller means to limit the range of movement of said roller means off said shaft member arcuate track.

9. Means for damping vibrations of a shaft member; said damping means comprising a weight member; each of said members having an arcuate track facing the arcuate track on the other of said members; roller means disposed between said tracks for rolling engagement with said tracks to provide a pendular support for said weight member from said shaft member; an annular flange on said roller means for preventing relative axial movement between said roller means and said shaft member track; and an abutment on said shaft engageable by said annular flange to limit the range of movement of said roller means off said shaft member arcuate track.

10. Means for damping vibrations of a shaft member; said damping means comprising a weight member; each of said members having an arcuate track facing the arcuate track on the other of said members; roller means disposed between said tracks for rolling engagement with said tracks to provide a pendular support for said weight member from said shaft member; an annular flange on said roller means for preventing relative axial movement between said roller means and said shaft member track; and an abutment on said shaft having an arcuate surface facing and parallel to said shaft member track and engageable by said roller means annular flange to limit the range of movement of said roller means off said shaft member arcuate track.

MARSHALL W. GALLIERS.

REFERENCES CITED

The following references are of record in the file of this patent:

. UNITED STATES PATENTS

| Number | Name | Date |
| --- | --- | --- |
| 2,239,078 | Chilton et al. | Apr. 22, 1941 |
| 2,484,073 | Chilton | Oct. 11, 1949 |